US 6,533,058 B2

(12) United States Patent
Peter

(10) Patent No.: US 6,533,058 B2
(45) Date of Patent: Mar. 18, 2003

(54) DRIVE FOR A FLAP ON A VEHICLE AND A PEDESTRIAN PROTECTION MEANS ON A MOTOR VEHICLE

(75) Inventor: Cornelius Peter, Buehl (DE)

(73) Assignee: TRW Automotive Electronics & Components GmbH & Co. KG, Radolfzell (DE)

( * ) Notice: Subject to any disclaimer, the term of this patent is extended or adjusted under 35 U.S.C. 154(b) by 9 days.

(21) Appl. No.: 09/924,886

(22) Filed: Aug. 8, 2001

(65) Prior Publication Data

US 2002/0017409 A1 Feb. 14, 2002

(30) Foreign Application Priority Data

Aug. 8, 2000 (DE) .......................... 200 13 909
Apr. 12, 2001 (DE) .......................... 201 06 478

(51) Int. Cl.$^7$ .......................... B60R 21/34; B62D 25/12
(52) U.S. Cl. .................. 180/274; 180/69.21; 49/141; 49/339
(58) Field of Search .................. 49/141, 325, 379, 49/339, 340, 341, 345; 296/76, 146.4; 180/274, 69.21, 69.2, 281, 271

(56) References Cited

U.S. PATENT DOCUMENTS

| | | | | |
|---|---|---|---|---|
| 3,713,472 A | * | 1/1973 | Dozois ...................... 160/189 |
| 3,735,840 A | * | 5/1973 | Sheperd ....................... 185/39 |
| 4,851,742 A | * | 7/1989 | Chapman ..................... 318/286 |
| 5,090,640 A | * | 2/1992 | Fessett ...................... 244/129.5 |
| 5,448,856 A | * | 9/1995 | Moore et al. .................. 49/340 |
| 5,531,498 A | * | 7/1996 | Kowall ..................... 296/146.4 |
| 6,055,776 A | * | 5/2000 | Dettling et al. ................ 49/341 |
| 6,092,336 A | * | 7/2000 | Wright et al. ................. 49/339 |
| 6,142,551 A | * | 11/2000 | Ciavaglia et al. .............. 296/56 |
| 6,145,917 A | * | 11/2000 | Ishii et al. ................ 296/146.1 |
| 6,181,094 B1 | * | 1/2001 | Menke ....................... 318/434 |
| 6,185,868 B1 | * | 2/2001 | Kato ........................... 49/339 |
| 6,293,362 B1 | * | 9/2001 | Sasaki et al. ............... 180/274 |
| 6,401,392 B1 | * | 6/2002 | Yuge ........................... 49/340 |

FOREIGN PATENT DOCUMENTS

| | | | |
|---|---|---|---|
| DE | 19963428 A1 | | 3/2001 |
| JP | 59006158 | | 1/1984 |
| JP | 60060051 | | 4/1985 |
| JP | 11-99906 A | * | 4/1999 |
| JP | 11099906 | | 4/1999 |
| JP | 11-263191 A | * | 9/1999 |
| JP | 11-0310158 A | * | 11/1999 |
| JP | 2000-203377 A | * | 7/2000 |

* cited by examiner

Primary Examiner—Paul N. Dickson
Assistant Examiner—Ruth Ilan
(74) Attorney, Agent, or Firm—Tarolli, Sundheim, Covell & Tummino L.L.P.

(57) ABSTRACT

The invention relates to a drive for a flap provided on a vehicle, especially an engine hood. The drive comprises an electric motor, an actuation shaft that is connected to the flap, and a reduction gear by means of which the rotor of the electric motor is coupled to the actuation shaft. The drive further comprises an energy accumulator by means of which the actuation shaft can be driven independently of the electric motor. The reduction gear is configured in such a way that the actuation shaft is driven in a rotational direction only by the energy accumulator and the electric motor drives the actuation shaft in an opposite rotational direction, thereby supplying to the energy accumulator an energy that is needed to drive the actuation shaft in the rotational direction. The invention further relates to a pedestrian protection means provided on a vehicle and equipped with such a drive.

20 Claims, 5 Drawing Sheets

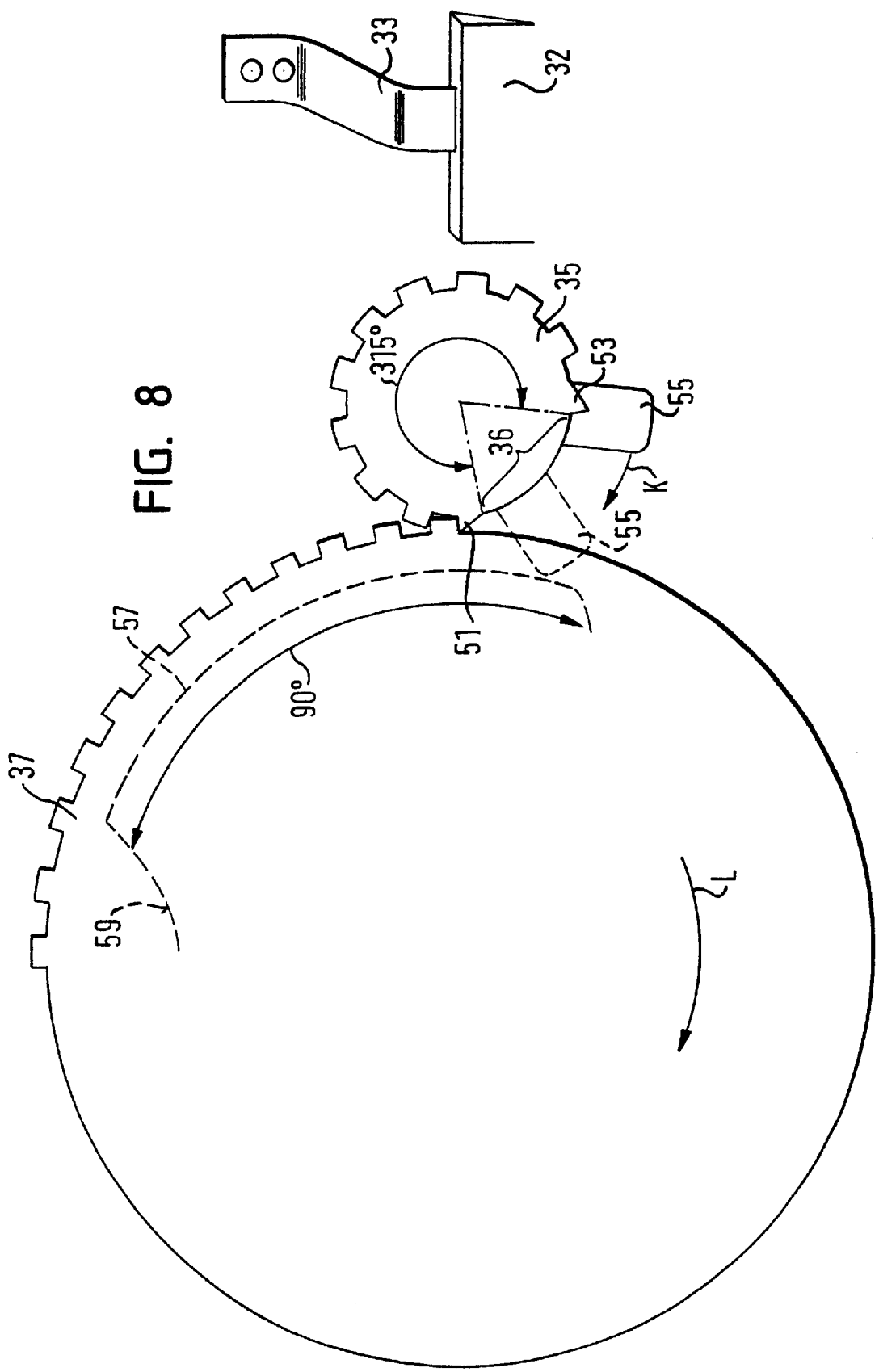

DRIVE FOR A FLAP ON A VEHICLE AND A PEDESTRIAN PROTECTION MEANS ON A MOTOR VEHICLE

TECHNICAL FIELD

The invention relates to a drive for a flap provided on a vehicle.

Moreover, the invention relates to a pedestrian protection means on a motor vehicle comprising an above mentioned drive.

BACKGROUND OF THE INVENTION

Today's automobiles are often provided with drives for the various flaps on the car concerned, including a vehicle door, a trunk lid or gas tank cover and especially an engine hood. Especially with regard to the attachment of engine hoods to the car body, pedestrian protection is to be improved in motor vehicles in that the engine hood is to be made more yielding. For this purpose, thought has been given, for example, to airbags for pedestrians or to a yielding suspension of the engine hood.

BRIEF SUMMARY OF THE INVENTION

The invention provides a very simple and effective drive that can be used, for example, for a pedestrian protection means comprising the engine hood. The drive proposed is configured in such a way that it raises the engine hood by a defined amount if a pedestrian is detected by an accident sensor. The engine hood is suspended in an elastically yielding manner by this amount so that the impact for the pedestrian is not as hard. The drive is capable of raising the engine hood within a few milliseconds. Moreover, it is capable of being used multiple times for the same purpose without having to go to the repair shop, an important aspect in view of the fact that the accident sensors may not always detect beyond all doubt a collision with a pedestrian but rather, for example, also with objects, for example, a box, which do not cause damage in case of a collision with the vehicle. A pyrotechnical drive device would have to be replaced at great expense after each actuation event that turned out to be unnecessary.

The drive proposed is, in particular, intended for use with an engine hood, but can likewise be used as a drive in the form of e.g. a closing means for a vehicle door or for another flap. The drive is distinguished by a simple structure and comprises an electric motor, an actuation shaft that is connected to the flap, and a reduction gear by means of which the rotor of the electric motor is coupled to the actuation shaft. The drive further comprises an energy accumulator by means of which the actuation shaft can be driven independently of the electric motor. The reduction gear is configured in such a way that the actuation shaft is driven in a rotational direction only by the energy accumulator and the electric motor drives the actuation shaft in a rotational direction opposite to the rotational direction called opposite rotational direction, thereby supplying to the energy accumulator an energy that is needed to drive the actuation shaft in the rotational direction.

The energy accumulator moves the flap, especially the engine hood, abruptly out of its original position into the desired raised position and the electric motor moves the flap back into the original or starting position against the resistance of the energy accumulator, in order to "arm" the energy accumulator once again.

According to one embodiment, the energy accumulator is firmly coupled with the actuation shaft. This means that no complicated coupling mechanisms are provided between the actuation shaft and the energy accumulator and/or the electric motor.

According to the preferred embodiment, the reduction gear is configured in such a way that it can be moved into a release position in which the energy stored in the energy accumulator is abruptly released so as to drive the actuator shaft. This means that the electric motor has multiple functions. On the one hand, it moves the flap back into the starting position and, on the other hand, it itself releases the energy accumulator by moving the reduction gear into the release position. In order for this to be possible within an extremely short period of time, the electric motor and the gear have to be designed with as little inertia and loss as possible. For this purpose, the electric motor is a brushless internal rotor that is not very susceptible to dirt deposits and the moving parts of which have a low inertial mass.

The reduction gear preferably has a toothed wheel that has no teeth on part of its circumference (toothless area). As soon as the toothless area is rotated so as to be vis-à-vis the toothed counterwheel, which is done by the electric motor, the release position is reached and the toothed counterwheel can rotate freely since the energy accumulator is activated. In the release position, the electric motor is then uncoupled from the actuation shaft.

Outside of the release position, the energy accumulator and the rotor of the electric motor are rigidly coupled to each other mechanically by means of the reduction gear.

The invention further relates to a pedestrian protection means provided on a vehicle and equipped with a drive as described above. The pedestrian protection means which is proposed has an engine hood and at least one drive to move the engine hood, the energy accumulator raising the engine hood in case of an accident out of an original position into a raised position and holding it in the raised position in an elastically yielding manner. The electric motor then can move the engine hood back into the original position. This means that the energy accumulator likewise has a double function in that, on the one hand, it raises the engine hood and, on the other hand, it ensures the yielding suspension of the engine hood in the raised position, so that the impact of the pedestrian on the engine hood is not so hard. Preferably, the energy accumulator is a spring energy accumulator, especially a spring energy accumulator with a spiral spring.

BRIEF DESCRIPTION OF THE DRAWINGS

FIG. 8 shows an enlarged view of the hollow wheel and the spur wheel.

DETAILED DESCRIPTION OF THE PREFERRED EMBODIMENT

Figure 1:
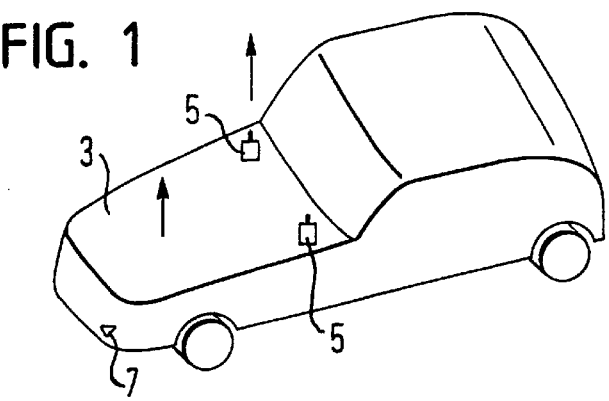
FIG. 1 shows a perspective view of a pedestrian protection means according to the invention with two drives according to the invention.
Figure 6:
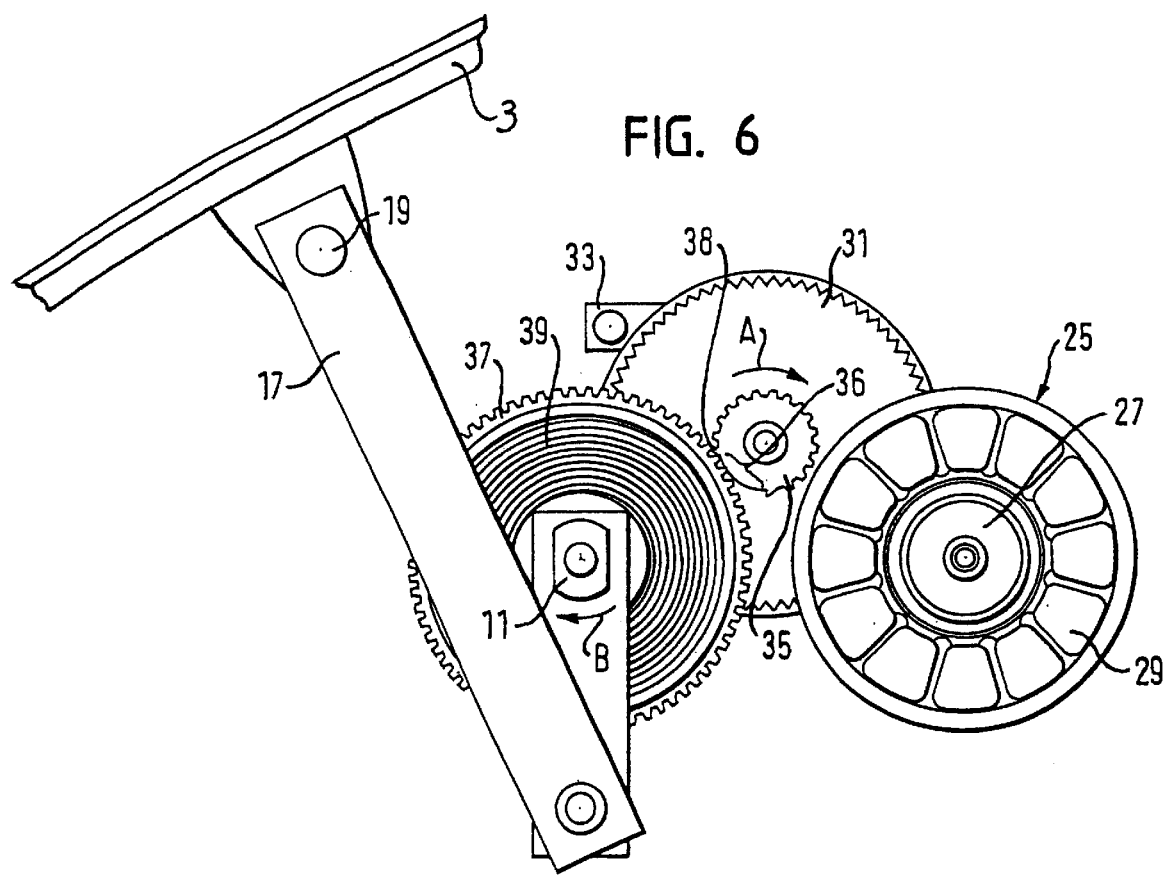
FIG. 6 shows a side view of the drive, only the moving parts being shown.
Figure 7:
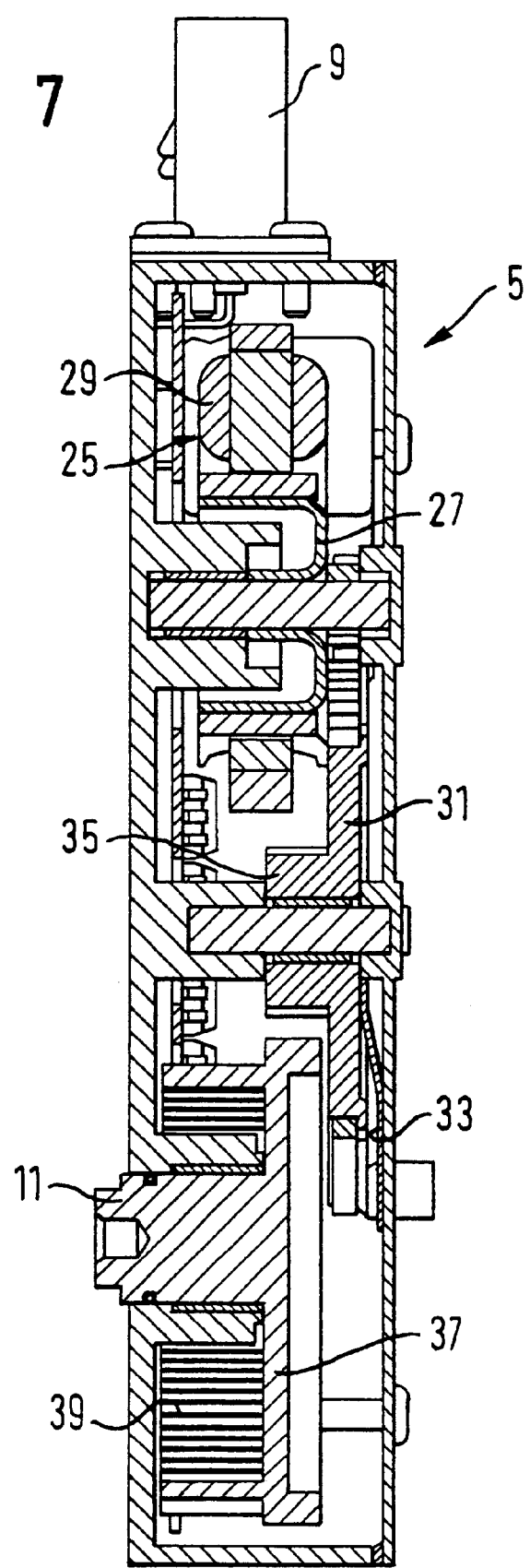
FIG. 7 shows a sectional view through the drive along the sectional line VII—VII in FIG. 5.

FIG. 1 shows a pedestrian protection means on a motor vehicle, comprising an engine hood 3 and two drives 5 that raise the engine hood 3 as soon as sensors 7 detect a pedestrian who is struck by the vehicle. The drives 5 are designed identically and are each provided at the rear outer end of the engine hood 3. Reference is being made to FIG. 6, from which the attachment of the rear end of the engine hood 3 to the moving parts of drive 5 is readily apparent. As an alternative, an additional drive could also be provided on the front end, but this drive would bring about less lifting than the rear drives. Not only can the drives 5 raise the engine hood 3 abruptly, but they can also hold it in this raised position in an elastically yielding manner, i.e. the drives themselves constitute an elastic suspension that provides a specific resistance to a force being exerted from the outside, which strives to bring the engine hood back to its original position.

Figure 2:
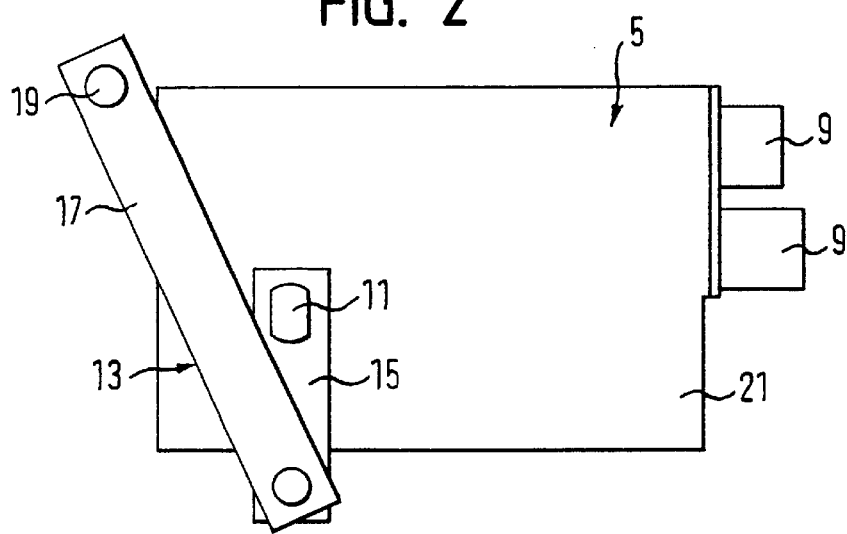
FIG. 2 shows an exterior view of the drive according to the invention when the hood is closed.
Figure 3:
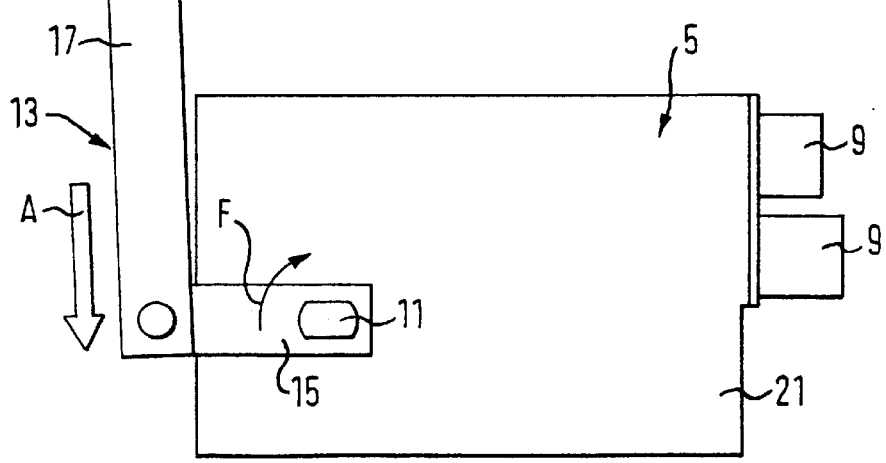
FIG. 3 shows an exterior view of the drive when the hood is open.

FIG. 2 shows one of the drives 5, which is very compact in design. The drive has an exterior housing 21 from which at least four electrical connections 9 extend as well as an actuation shaft 11 that is connected to a lever mechanism 13 consisting of levers 15 and 17. An articulation point 19 serves to create a coupling to the hood. In the area of this articulation point 19, the hood can be uncoupled from the lever mechanism in order to open the engine hood. FIG. 2 shows the drive when the engine hood 3 is in the original position. The drive 5 can rotate the lever 15 clockwise by 90° within 60 to 70 milliseconds in case of a collision with a pedestrian, thus raising the articulation point by about 55 mm. In the raised position shown in FIG. 3 (also called the holding position), the drive has springy action or a resilient effect, i.e. when the pedestrian makes contact with the engine hood, the hood is elastically pressed downwards in the direction of the arrow A against the force F of the drive.

Figure 4:
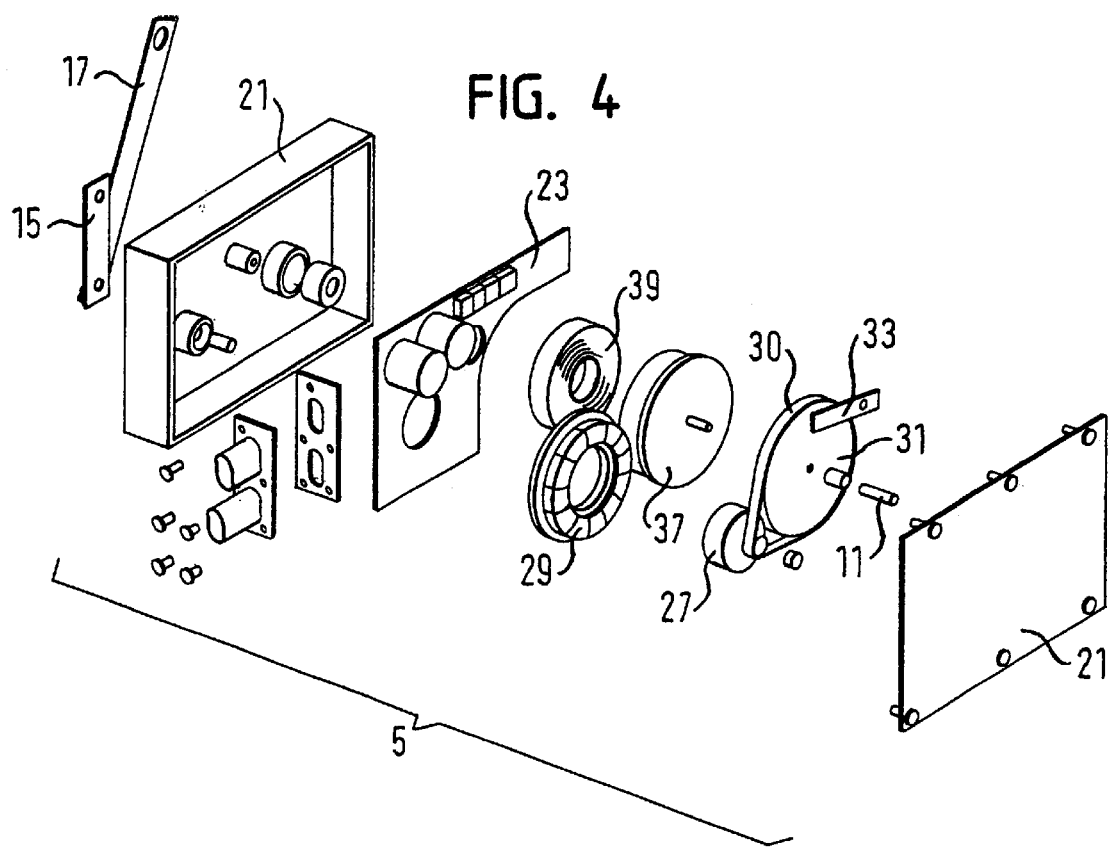
FIG. 4 shows a view of the drive without the cover.
Figure 5:
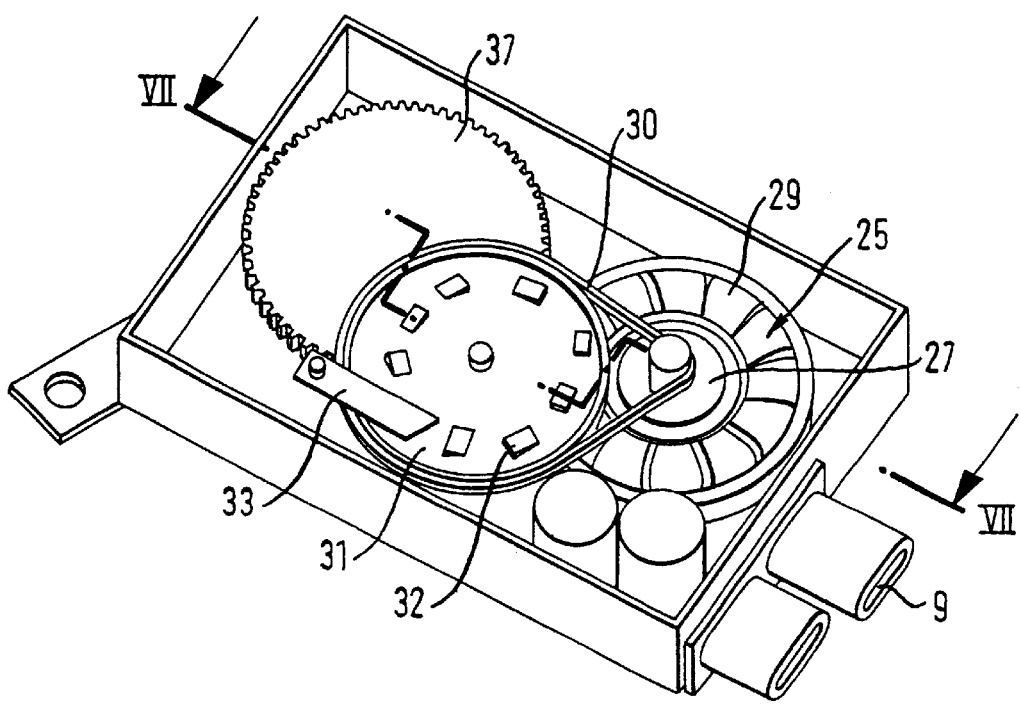
FIG. 5 shows an exploded view of the drive according to the invention.

The drive is shown in greater detail in FIG. 4; it has a housing 21, an electronic means 23 as well as a direct-current motor without a commutator and configured as an internal rotor, which can also be seen in FIG. 5, where it is designated by the reference numeral 25. FIG. 4 shows the rotor (armature) 27 and the stator 29. The rotor 27 is coupled to the actuation shaft 11 by means of a two-stage reduction gear. A first stage of the gear is a toothed belt gear, the toothed belt 30 being coupled to a rotor shaft and a large toothed wheel 32, whose front face has wedge-shaped elevations 32 that interact with a leaf spring that functions as an return stop 33, so that the toothed wheel 31 can only be turned in one direction (in FIG. 5 counterclockwise). On the rear of the toothed wheel 31, as FIG. 6 shows, there is provided a small, formed-on spur wheel 35 that is not completely surrounded by teeth on its outer circumference but rather that has a toothless circumferential area or section 36. An toothed counterwheel, which is configured as a cup-shaped hollow wheel 37, can mesh with the spur wheel 35 to form the second stage of the gear. An energy accumulator in the form of a spring accumulator 39 is accommodated inside the hollow wheel 37. The radial inner end of the spring accumulator 39 is coupled to the actuation shaft 11, and the radial outer end is coupled to the housing 21. The hollow wheel 37 is likewise coupled to the actuation shaft 11 so as to be non-rotatable.

FIG. 6 shows the drive in its original position. In this position, the first tooth 38 on the circumference and in the clockwise direction beyond the toothless section 37 on the spur wheel 35 is just barely still engaged with the toothed wheel 36, so that the actuation shaft 11 is firmly coupled to the rotor 27 mechanically via the hollow wheel 37, the spur wheel 35, the toothed wheel 31 and the toothed belt 30. The spring in the spring accumulator 39 is tensioned and strives to drive the actuation shaft 11 in the first, clockwise direction (arrow B). This drive, however, is not possible in the gear position shown here since the return stop 33 is active so that there is no risk that the engine hood will be moved upwards by the energy accumulator during normal driving operations.

As soon as a pedestrian is detected, who, according to a vehicle control (not shown), collides with the vehicle, the electric motor 25 is activated so that the rotor 27 moves within just a few milliseconds, thereby moving the toothed wheel 31 together with the formed-on spur wheel 35 in the direction of the arrow A. The spring is still minimally tensioned a bit more until finally, the above-mentioned first tooth on the spur wheel is disengaged from the opposite teeth on the toothed counterwheel in the form of a hollow wheel 37, so that the two toothed wheels 35, 37 are no longer engaged and the reduction gear reaches a release position. In this position, the rotor is uncoupled from the actuation shaft 11 and the spring accumulator 39 can abruptly release its energy and drive the actuation shaft 11 in the direction of the arrow B, thus raising the engine hood. Therefore, the arrow B shows the rotational direction in which the actuation shaft 11 is only driven by the energy accumulator.

In the raised position, the engine hood can be pushed down against the force of the spring.

After the activation has occurred, the engine hood is automatically moved downwards since the rotor 27 is turned in the same rotational direction as before in order to reach the release position, so that finally, a tooth of the spur wheel 35 engages with the hollow wheel 37 again. Now the rotor 27 is again firmly coupled to the actuation shaft 11 and can turn the latter in the opposite direction of arrow B which opposite direction is called the opposite rotational direction. During this resetting into the position shown in FIG. 6, the spring is tensioned once again so that it can be released again at a later point in time.

FIG. 8 shows a few details that have not been mentioned yet, which are advantageous especially during the release of the spring energy.

The teeth of the spur wheel 35 and of the hollow wheel 37 are virtually rectangular in order to increase the load-bearing capacity of the teeth. The teeth themselves are only about 0.7 mm deep, of which only about 0.5 mm are engaged, in order to reduce the activation angle and thus the activation time to a minimum. From the original position shown in FIG. 8, a rotation of just 20° on the spur wheel 35, i.e. 120° on the motor, is needed in order to disengage the teeth of the spur wheel 35 and of the hollow wheel 37 and to release the spring energy.

The so-called free-wheeling position, that is to say, the position of the spur wheel 35 when the engine hood 3 is in the raised position, is turned by about 50° in the clockwise direction as compared to the original position shown in FIG. 8.

The so-called start position, that is to say, the position of the spur wheel 35 after which a tooth 53 of the spur wheel 35 is once again engaged with the teeth of the hollow wheel 37, is at about a 75° rotation in the clockwise direction relative to the original position shown in FIG. 8.

After a rotation of the spur wheel 35 by 360°, the original position is reached once again.

Another detail worth mentioning is that the first and the last teeth 51, 53 that are engaged, that is to say, the two teeth that delimit the toothless circumferential section 36, have a very slanted rear tooth flank. In this manner, a collision with the teeth of the hollow wheel 37 is to be largely avoided. The toothless circumferential section 36 extends approximately over an angle of 45°.

Between the spur wheel 35 and the toothed wheel 31, a finger-like, projecting stop 55 is connected to the toothed wheels 31, 35 so as to be non-rotatable. The stop 55 serves to fix the position of the spur wheel 35 in the so-called freewheeling position, i.e. when the teeth of the spur wheel 35 and of the hollow wheel 37 are not engaged with each other. The stop is supposed to achieve that the spur wheel 35 and the hollow wheel 37 remain in the free-wheeling position with respect to each other until the drive, that is to say, the actuation shaft 11, has turned by 90°. For this purpose, the hollow wheel 37 has a shoulder on the end face in the form of a circular cylinder segment. This shoulder is designated with the reference numeral 57. The shoulder ends after about 90° in an indentation 59. When the spur wheel 35, together with the stop 55, is rotated clockwise by about 50°, so that the stop 55 is in the position shown by the broken lines, then it strikes the shoulder 57. The spur wheel 35 cannot turn any further and it is in the free-wheeling position. The hollow wheel 37 is driven in the direction of the arrow L. As soon as the indentation 59 has been turned to the stop 55, the latter can swivel past the shoulder 57 and the spur wheel 35 can continue to turn.

All of the toothed wheels shown can be easily made of plastic in order to avoid the need for lubrication of the teeth and to reduce the manufacturing costs.

The arrangement shown can also be used with a vehicle door or with an engine hood in order to serve as a closing means, whilst this embodiment should also have a lever arrangement in order to once again engage the spur wheel 35 with the hollow wheel 37 beyond the release position when the electric motor is current-free, so as to make the return stop go into action. As an alternative, it is also possible to provide an energy buffer, e.g. the battery or an auxiliary battery, that causes the spur wheel 35 to engage with the hollow wheel 37 once again beyond the release position.

The electric motor is a brushless, highly dynamic direct current motor.

What is claimed is:

1. A drive for a flap provided on a vehicle, said drive comprising:

an electric motor, an actuation shaft that is connected to said flap, a reduction gear by means of which said rotor of said electric motor is coupled to said actuation shaft, an energy accumulator by means of which said actuation shaft can be driven independently of said electric motor, said reduction gear being configured in such a way that said actuation shaft is driven in one rotational direction only by said energy accumulator, and said electric motor drives said actuation shaft in an opposite rotational direction, thereby supplying to said energy accumulator an energy that is needed to drive said actuation shaft in said rotational direction.

2. The drive according to claim 1, wherein said energy accumulator is firmly coupled with said actuation shaft.

3. The drive according to claim 1, wherein said reduction gear can be moved by means of said electric motor into a release position in which said energy stored in said energy accumulator is abruptly released so as to drive said actuator shaft.

4. The drive according to claim 3, wherein said energy accumulator is uncoupled from said electric motor in said release position.

5. The drive according to claim 4, wherein said reduction gear has a toothed wheel that has a circumference and a toothless area on part of said circumference and a toothed counterwheel, as soon as said toothless area of said toothed wheel is rotated so as to be adjacent said toothed counterwheel, said release position is reached.

6. The drive according to claim 5, wherein, between said toothed wheel and said toothed counterwheel, there is provided a mechanical stop which prevents a further rotation of said toothed wheel and holds said toothed wheel in said release position after said release position has been reached.

7. The drive according to claim 6, wherein said stop is released after rotating said toothed counterwheel by a predefined rotational angle, so that said toothed wheel and said toothed counterwheel will mesh with each other again, and energy can be supplied to said energy accumulator again.

8. The drive according to claim 5, wherein, in said reduction gear, there is provided a mechanical return stop which outside of said release position counteracts a rotation of said toothed wheel caused by said energy accumulator.

9. The drive according to claim 3, wherein outside of said release position said energy accumulator and said rotor of said electric motor are firmly coupled to each other mechanically.

10. The drive according to claim 3, wherein said reduction gear is configured in such a manner that said motor turns in the same direction, both when driving said actuation shaft in said opposite rotational direction and when moving said reduction gear into said release position.

11. The drive according to claim 1, wherein said drive and said energy accumulator are configured in such a way that said energy accumulator, after having effectuated said drive in said rotational direction, acts in an elastically yielding manner against a force exerted from outside, which strives to cause a movement in said opposite rotational direction.

12. The drive according to claim 11, wherein said energy accumulator is a spring accumulator.

13. The drive according to claim 1, wherein said electric motor is a brushless motor.

14. The drive according to claim 1, wherein said electric motor is designed as a motor with an internal rotor.

15. The drive according to claim 1, wherein a lever mechanism is coupled to an output side of said actuation shaft for attachment to said flap.

16. The drive according to claim 1, wherein said flap is an engine hood.

17. The drive according to claim 12, wherein the spring accumulator comprises a spiral spring.

18. A pedestrian protection means provided on a vehicle, said means comprising:

an engine hood and at least one drive for raising said engine hood, said drive comprising an electric motor, an actuation shaft that is connected to said flap, a reduction gear by means of which said rotor of said electric motor is coupled to said actuation shaft, an energy accumulator by means of which said actuation shaft can be driven independently of said electric motor, said reduction gear being configured in such a way that said actuation shaft is driven in a rotational direction only by said energy accumulator and said electric motor drives said actuation shaft in an opposite rotational direction, thereby supplying to said energy accumulator an energy that is needed to drive said actuation shaft in said rotational direction, said energy accumulator raising said engine hood in case of an accident out of an original position into a raised position and holding it in said raised position in an elastically yielding manner, and said electric motor being able to move said engine hood back into said original position.

19. The pedestrian protection means according to claim 18 wherein said electric motor is activated in order to release said energy stored in said energy accumulator.

20. The pedestrian protection means according to claim 18, wherein said engine hood has a rear end, at least one of said drives being provided on said rear end.

* * * * *